Dec. 16, 1958  J. J. HARMON  2,865,003

TEST STAND FOR TRANSISTOR

Filed Aug. 31, 1953

INVENTOR
JOHN HARMON
BY
Michael Hertz
ATTORNEY

United States Patent Office 2,865,003
Patented Dec. 16, 1958

2,865,003

TEST STAND FOR TRANSISTOR

John J. Harmon, Boston, Mass., assignor to Sylvania Electric Products Inc., a corporation of Massachusetts Application August 31, 1953, Serial No. 377,398

9 Claims. (Cl. 324—158)

This invention relates to a test stand constructed to enable rapid insertion and withdrawal of the terminals of an electrical device into and out of contact holes in a socket in the stand for enabling tests to be made on a rapid succession of such devices.

It is an object of the invention to provide means whereby the operator can easily and readily plug in the devices under test into the socket.

It is a further object of the invention to provide means to insure good electrical connection between the contacts in the test socket and the terminals on the device under test.

It is yet a further object of the invention to provide a test socket contact construction whereby the contacts may have long life against breakage in spite of repeated usage to which the test socket may be subjected.

These and further objects will be apparent after reading the following specification and claims when taken in conjunction with the accompanying drawing in which:

Figure 1:
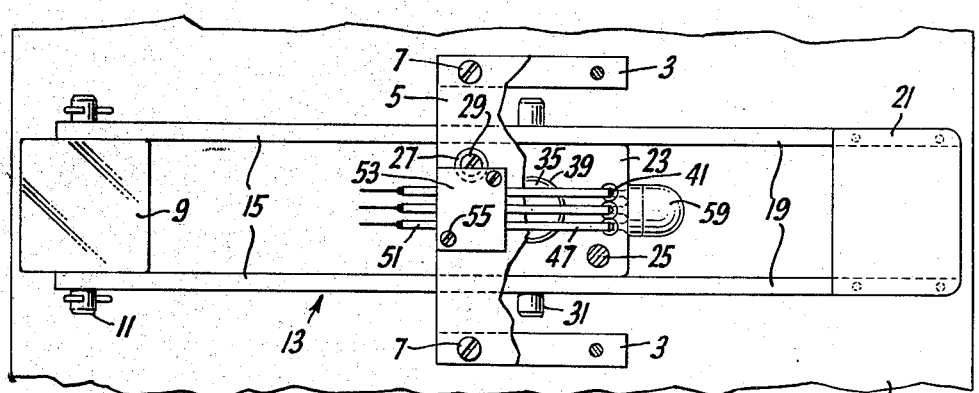
Fig. 1 is a plan view of the test stand, parts being broken away to show spring contact fingers and other parts.
Figure 2:
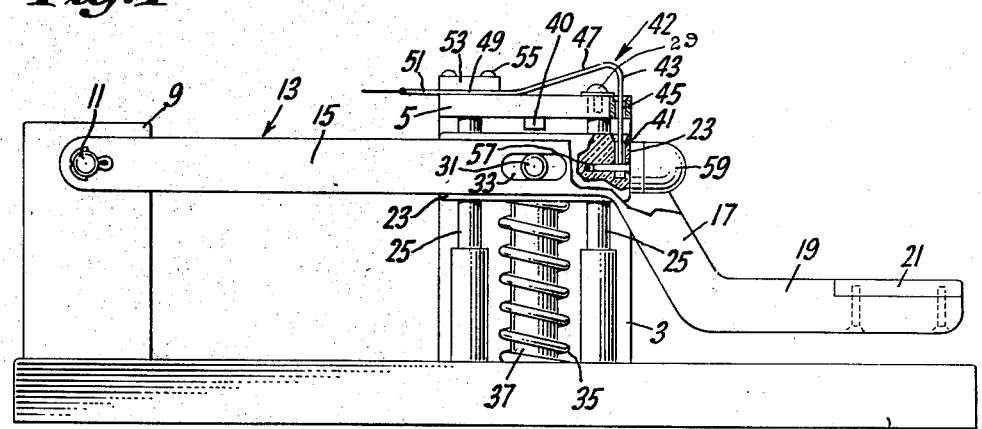
Fig. 2 is a side elevation of the stand with portions broken away to disclose the contact fingers and related portions, a contact being shown as abutting a terminal of a transistor to be subjected to a test while in the stand.
Figure 3:
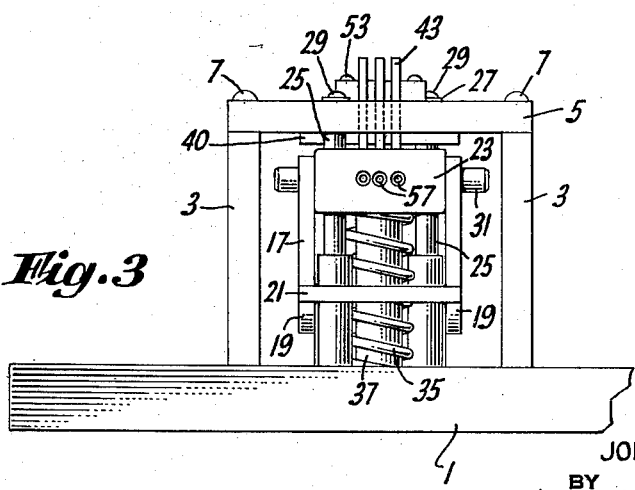
Fig. 3 is a front view of the stand.

Referring to the drawings more specifically, the test stand is shown as having a base 1 on which is rigidly mounted a pair of side plates or standards 3 in spaced parallel relation, the standards being capped by a dielectric bridge plate 5 suitably secured to the standards, as by screws 7. At the rear of the base is rigidly mounted a rectangular prism 9 in which is positioned a horizontal pivot pin 11, pivotally mounting a lever 13 having two parallel rear arms 15. These arms extend forwardly underneath the bridge plate. At the forward end, the arms extend downwardly as at 17, and then forwardly, to form forward arms 19, offset from the rear arms 15. The forward ends of arms 19 are recessed to accommodate a platform or wrist rest plate 21 which may be suitably secured to the arms 19, as by screws, welding, or the like. Underneath the bridge plate 5 is a test socket block 23 of insulating material, guided for sliding movement on a pair of diagonally opposite vertical guide rods 25. The guide rods are suitably secured to the base and extend upwardly into openings in the bridge plate. To hold the rods firmly in position suitable washers 27 and screws 29 are provided, the screws threading into threaded openings in the upper ends of the guide rods.

The socket block has tightly fitted therein a pin 31 whose ends project through the sides of the block and into horizontal slots 33 provided in the arms 15 to form a pivotal sliding connection between the block and the arms 15. Interposed between the block 23 and the base is a coil spring 35, this spring being supported against excessive lateral movement by surrounding a post 37 rigidly secured to the base. The upper end of the post passes through an opening 39 in block 23. Sufficient clearance is provided between the block and post to enable free sliding movement of the block along the guide rods 25. The block is limited in its upward movement by engagement with a stop bar 40, suitably secured underneath bridge plate 5. Downward movement is limited by engagement of the forward ends of arms 19 with the base 1.

The block 23 is provided with three vertical bores 41, each slidably accommodating the lower end of the vertical portion of a cantilever leaf spring 42. Each of the leaf springs also extends upwardly freely through a bore 45 in the bridge plate 5, to a position above the level of the plate, and then, as indicated at 47, downwardly and rearwardly to the top of the plate and finally, as indicated at 49, rearwardly along the plate 5. The rear of each spring forms a circuit terminal 51 to which a conductor may be attached in any suitable manner. To hold the springs in place on the plate 5, there is provided a non-conductive clamp block 53 which may be suitably recessed on its bottom to accommodate the springs, and which is fastened to the bridge plate in any suitable manner, as by screws 55. The leaf springs 42 are very long compared to their width and thickness. This formation of the springs coupled with the arched construction between segments 43 and 47 thereof contribute toward long life of the springs and allow for ease in longitudinal displacement of the spring portions 43 in the bores 41 and 45. The block 23, besides having the bores 41, have rearwardly directed horizontal bores 57 opening in flared portions in the forward face of block 23 and intersecting the bores 41. These bores 57 are spaced apart laterally and of a size to accommodate the terminal pins of an object under test, as a transistor 59.

The portions of springs 43 are of such length that when the block 23 is in its uppermost position as determined by engagement of the upper face of block 23 with the stop bar 40, the lower ends of the springs, without the terminal of a device under test in the bores 57, will extend below the horizontal level of the bores 57. When the platform 21 is depressed, however, the bores 57 can be moved to a position below the lower level of the springs, allowing insertion of the terminal pins of a device to be tested, well into the bores 57 without obstruction of the bores by the leaf springs.

In operating the test stand, as for testing transistors, a transistor 59 is held between the fingers with its terminals directed toward the bores 57 while the wrist depresses the platform to lower the bores 57 below the bottoms of the springs 42. The transistor terminals are now thrust into the bores 57 and the wrist elevated, permitting the spring 35 to expand and force the block 23 upwardly. As the block moves upwardly, the terminals on the transistor engage the bottoms of the springs, make firm contact therewith and then raise the lower sections 43 of the springs, subjecting them to a slight cantilever movement with bending forces distributed along the length of the spring between the block 53 and the portion 43. Thus while good contact is obtained between springs and transistor terminals, very little strain is imposed on any restricted portions of the cantilever springs, thereby contributing toward their long life.

The wrist movement on the platform of the lever while holding the test device in the fingers permits ease of operation of the stand and facilitates testing operations.

Having thus described my invention, what I claim as new is:

1. A test stand comprising a base, a substantially horizontally mounted lever pivoted at one end to said base about a substantially horizontal axis, a platform on the free end of said lever, a socket intermediate the ends of said lever mounted for movement with said lever, said socket having a bore extending toward the pivoted end of said lever and said bore being adapted to have inserted thereinto a terminal of an electrical device, a cantilever mounted spring leaf contact member fixedly mounted with respect to the base with the free end of the leaf extending vertically downward and in a direction transverse to and adapted to intersect the bore and in the path of movement of said terminal to make electrical contact therewith upon movement of said socket, and the confined end of the spring extending in a generally horizontal direction.

2. A test stand comprising a base, a substantially horizontally mounted lever pivotally mounted on said base about a substantially horizontal axis, said lever having a portion at the free end offset downwardly, a platform on the free end of said lever, a socket mounted on the upper portion of the lever for movement therewith, said socket having a substantially horizontal bore extending toward the pivotally mounted end of the lever and said bore being adapted to have inserted thereinto a terminal of an electrical device, the bore opening on the face of the socket facing the free end of the lever, means resiliently urging the lever upwardly about its pivotally mounted end, and an electrical contact member fixedly mounted with respect to the base, said contact member having a portion extending transverse to and adapted to intersect the bore and being in the path of movement of said terminal to make electrical contact therewith upon movement of said socket.

3. A test stand comprising a base, a substantially horizontally mounted lever pivotally mounted on said base about a substantially horizontal axis, said lever having a portion at the free end offset downwardly, a platform on the free end of said lever, a socket mounted on the upper portion of the lever for movement therewith, said socket having a substantially horizontal bore extending toward the pivotally mounted end and said bore being adapted to have inserted thereinto a terminal of an electrical device, the bore opening on the face of the socket facing the free end of the lever, means resiliently urging the lever upwardly about its pivotally mounted end, and a cantilever mounted spring leaf contact member fixedly mounted with respect to the base with the free end of the leaf extending vertically downward in a direction transverse to and adapted to intersect the bore and in the path of movement of said terminal to make electrical contact therewith upon movement of said socket, the confined end of the spring extending in a generally horizontal direction.

4. A test stand comprising a base, a substantially horizontally mounted lever mounted at one end on said base for pivotal movement about a substantially horizontal axis, a platform on the other end of said lever, a socket adapted to support an electrical device provided with a terminal, said socket being pivotally and slideably mounted on said lever intermediate the ends thereof, means guiding the socket for vertical rectilinear movement during swinging movement of the lever, and a contact element fixedly mounted with respect to the base and having a portion extending in a direction transverse to the socket and in the path of movement of said terminal to make electrical connection therewith upon upward movement of the lever.

5. A test stand including a base, a substantially vertically movable socket, vertical base supported means for guiding vertical movement of said socket, said socket having at least one passage for receiving a terminal of a device to be tested, said passage extending transverse to the direction of guided movement of the socket, a resilient contact carried by the base and extending along the direction of guided movement of the socket and into the passage in one end position of the socket, means biasing said socket toward said end position, and a manual actuator operatively connected to said socket and having a portion offset downwardly and forwardly of the socket for engagement and depression by the hand as that hand inserts a device to be tested into the socket.

6. A test stand having a depressible element, a test socket mounted on said element with a bore extending in a generally horizontal direction to receive the terminal of a device to be subjected to test, a second vertical bore in said socket intersecting the first bore, a contact device mounted on a fixed portion on the base, said contact device being positioned in said second bore, said contact device extending across and obstructing the first bore in normal raised position of said depressible element and with no test device supported by the socket, said socket being adapted to be depressed so that said first bore is below the level of the bottom of the contact device to enable insertion of said terminal into said first bore, whereby upon elevation of the depressible element the terminal engages the contact device.

7. A test stand having a depressible element, a test socket mounted on said element with a bore extending in a generally horizontal direction to receive the terminal of a device to be subjected to test, a second, vertical, bore in said socket intersecting the first bore, a cantilever type contact device having a horizontal portion fixed with respect to the base and a vertical portion extending into said second bore, the free end of said contact device extending across and obstructing the first bore in normal raised position of said depressible element and with no test device supported by the socket, said socket being adapted to be depressed so that said first bore is below the level of the bottom of the contact device to enable insertion of said terminal into said first bore, whereby, upon elevation of the depressible element, the terminal engages the contact device.

8. A test stand comprising a base, a substantially horizontally mounted lever pivoted at one end to said base on a horizontal pivot, a platform for depression by the hand of an operator on the free end of said lever, a socket supported by the lever having a horizontal bore for reception of an electrical terminal of a device to be held by the fingers of the hand which depresses the platform, and an electrical contact member supported by the base, said contact member having a portion extending transverse to and adapted to intersect the bore and being in the path of movement of said terminal to make electrical contact therewith upon movement of said socket.

9. A test stand comprising a base, a substantially horizontally mounted lever pivoted at one end to said base on a horizontal pivot, a platform for depression by the hand of an operator on the free end of said lever, a socket supported by the lever having a horizontal bore extending toward the pivoted end of said lever for reception of an electrical terminal of a device to be held by the fingers of the hand which depresses the platform, and an electrical contact member supported by the base, said contact member having a portion extending transverse to and adapted to intersect the bore and being in the path of movement of said terminal to make electrical contact therewith upon movement of said socket.

References Cited in the file of this patent

UNITED STATES PATENTS

| | | |
|---|---|---|
| 1,313,572 | Baker | Aug. 19, 1919 |
| 1,685,847 | Huntington | Oct. 2, 1928 |
| 2,420,055 | Sanders | May 6, 1947 |
| 2,503,729 | Gruszecki | Apr. 11, 1950 |
| 2,510,944 | Auerback | June 13, 1950 |
| 2,594,748 | Earl | Apr. 29, 1952 |
| 2,606,228 | Chouljian | Aug. 5, 1952 |
| 2,627,537 | Weisberg | Feb. 3, 1953 |

FOREIGN PATENTS

| | | |
|---|---|---|
| 625,388 | Great Britain | June 27, 1949 |
| 672,146 | Great Britain | May 14, 1952 |